United States Patent
Lee et al.

(10) Patent No.: US 12,157,468 B2
(45) Date of Patent: Dec. 3, 2024

(54) REGENERATIVE BRAKING CONTROL METHOD OF xEV VEHICLE BASED ON DRIVING RECOGNITION

(71) Applicant: Foundation of Soongsil University-Industry Cooperation, Seoul (KR)

(72) Inventors: Jin Wook Lee, Seoul (KR); In Su Cho, Hwaseong-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 243 days.

(21) Appl. No.: 17/801,240

(22) PCT Filed: Oct. 15, 2021

(86) PCT No.: PCT/KR2021/014321
§ 371 (c)(1),
(2) Date: Aug. 19, 2022

(87) PCT Pub. No.: WO2022/092647
PCT Pub. Date: May 5, 2022

(65) Prior Publication Data
US 2022/0410899 A1   Dec. 29, 2022

(30) Foreign Application Priority Data

Oct. 27, 2020   (KR) .......................... 10-2020-0140479

(51) Int. Cl.
*B60W 30/18* (2012.01)
*B60L 7/18* (2006.01)

(52) U.S. Cl.
CPC ......... *B60W 30/18127* (2013.01); *B60L 7/18* (2013.01); *B60W 2420/408* (2024.01);
(Continued)

(58) Field of Classification Search
CPC .... B60W 30/18127; B60L 7/18; Y02T 10/62; Y04S 10/126; B60T 7/042
See application file for complete search history.

(56) References Cited

U.S. PATENT DOCUMENTS

| | | | |
|---|---|---|---|
| 2015/0183433 A1* | 7/2015 | Suzuki .................. | B60W 10/06 701/96 |
| 2015/0232095 A1* | 8/2015 | Sato .................... | B60L 15/2009 701/22 |

(Continued)

FOREIGN PATENT DOCUMENTS

| | | |
|---|---|---|
| JP | 2006-044654 A | 2/2006 |
| JP | 2014-016955 A | 1/2014 |

(Continued)

OTHER PUBLICATIONS

Bian, Jindong, Effect of road gradient on regenerative braking energy in a pure electric vehicle, Proceedings of the Institution of Mechanical Engineers, Part D: Journal of Automobile Engineering, p. 1736-1746 (Year: 2018).*

*Primary Examiner* — Jonathan L Sample
*Assistant Examiner* — Mohammed Yousef Abuelhawa
(74) *Attorney, Agent, or Firm* — Stein IP, LLC

(57) ABSTRACT

A driving recognition-based regenerative braking control method of an xEV vehicle according to an embodiment of the present invention relates to a driving recognition-based regenerative braking control method of an xEV vehicle which optimally adjusts an amount of regenerative braking using preceding vehicle sensing and driving position information.

7 Claims, 4 Drawing Sheets

(52) U.S. Cl.
CPC ..... *B60W 2552/15* (2020.02); *B60W 2552/30* (2020.02); *B60W 2554/4041* (2020.02); *B60W 2554/802* (2020.02)

(56) References Cited

U.S. PATENT DOCUMENTS

| | | | |
|---|---|---|---|
| 2016/0214609 A1* | 7/2016 | Yamaoka | B60W 30/0956 |
| 2016/0362096 A1* | 12/2016 | Nikovski | G01C 21/3469 |
| 2018/0059686 A1* | 3/2018 | Liu | B60W 30/0953 |
| 2018/0297475 A1* | 10/2018 | Zhao | B60L 7/18 |
| 2019/0061715 A1* | 2/2019 | Kato | B60L 7/18 |
| 2020/0023817 A1* | 1/2020 | O'Meachair | G09B 19/167 |

FOREIGN PATENT DOCUMENTS

| | | | |
|---|---|---|---|
| JP | 2014-204510 A | 10/2014 | |
| JP | 2015-140099 A | 8/2015 | |
| JP | 2017-081475 A | 5/2017 | |
| KR | 10-0259898 B1 | 6/2000 | |
| KR | 10-2015-0007626 A | 1/2015 | |
| KR | 10-1541711 B1 | 8/2015 | |
| KR | 10-1558772 B1 | 10/2015 | |
| KR | 10-2017-0095003 A | 8/2017 | |
| KR | 10-2017-0096372 A | 8/2017 | |
| KR | 10-2018-0130243 A | 12/2018 | |
| KR | 10-1944310 B1 | 2/2019 | |

\* cited by examiner

REGENERATIVE BRAKING CONTROL METHOD OF xEV VEHICLE BASED ON DRIVING RECOGNITION

TECHNICAL FIELD

The present invention relates to a regenerative braking control method of an xEV vehicle, and more specifically, to a driving recognition-based regenerative braking control method of an xEV vehicle which optimally adjusts an amount of regenerative braking using preceding vehicle sensing and driving position information.

BACKGROUND ART

Recently, in the automobile industry, the paradigm of an automobile motor has changed from an existing internal combustion engine automobile to an xEV (for example, hybrid electric vehicle (HEV), plug-in hybrid electric vehicle (PHEV), battery electric vehicle (BEV), fuel cell electric vehicle (FCEV), or the like). In the xEV in which an electric motor is used as a main power source, a regenerative braking technology is a technology of converting the kinetic energy of a vehicle, which is dissipated as frictional heat when braking the vehicle, to electrical energy and storing the electrical energy in an electric storage device such as a battery or an ultra capacitor so that the electrical energy can be used again as driving energy, and the regenerative braking technology operates in such a way that electric energy is generated at the same time as the vehicle decelerates by using the electric motor as a generator to generate a load force.

Such regenerative braking technology can improve the energy efficiency of a vehicle in a city driving environment in which acceleration and deceleration are frequent, and thus is considered as a core technology for improving energy efficiency.

However, although there are various variables in the driving environment of the vehicle, and specifically, a driving tendency and a driving pattern of a driver are also inconsistent, and thus it is difficult to more actively recover maximum regenerative braking energy, a conventional regenerative braking technology has a problem in that an actual driving situation is not considered and thus the regenerative braking energy is not more efficiently recovered.

Accordingly, there is a need for a regenerative braking control method in consideration of the actual driving situation

PRIOR ART DOCUMENT

Patent Document (Patent Document 1) Korean Registration Patent No. 10-0259898

DETAILED DESCRIPTION

Technical Problem

The present invention is proposed to solve the above problems, and is directed to providing a driving recognition-based regenerative braking control method of an xEV vehicle capable of determining a region where maximum regenerative braking energy may be recovered to maximize an amount of electrical energy to be recovered and maximize charging of a secondary battery by using preceding vehicle sensing and driving position information.

Technical Solution

A driving recognition-based regenerative braking control method of an xEV vehicle according to an embodiment of the present invention includes operations of: (a) sensing a preceding vehicle when a brake signal is applied; (b) operating a regenerative braking system as much as a default regenerative braking value when the preceding vehicle is not sensed, and calculating a distance to the preceding vehicle and a braking distance required by a driver when the preceding vehicle is sensed; (c) comparing an α value in which a safe distance to the preceding vehicle at a final stop is subtracted from the distance to the preceding vehicle, and a β value in which a regenerative braking distance due to a default regenerative braking value is subtracted from the braking distance required by the driver based on a signal of a brake pedal sensor (BPS); (d) operating the regenerative braking system as much as the default regenerative braking value when the β value is larger, and preparing to increase a maximum regenerative braking value as much as a difference value when the α value is larger; (e) determining a vehicle driving position to operate the regenerative braking system as much as the default regenerative braking value in a case of a downhill road, and to operate the regenerative braking system as much as the maximum regenerative braking value prepared in the operation (d) in a case of an uphill road or a flat road; and (f) recognizing that the vehicle is stationary and stopping an operation of the regenerative braking system when the distance to the preceding vehicle becomes the same as a safe distance value and a vehicle speed becomes 0, and returning to operation (a) when the distance to the preceding vehicle is different from the safe distance value or the vehicle speed is not 0.

Here, the sensing of the preceding vehicle in the operation (a) and the calculation of the distance to the preceding vehicle in the operation (b) may be made through single sensing of any one of a radar sensor and a LiDAR sensor or combination thereof.

Further, the determination of the vehicle driving position in the operation (e) may be performed through single measurement of any one of a global positioning system (GPS) and an inertial measurement unit (IMU) or combination thereof.

In addition, the braking distance required by the driver may be calculated by adding and subtracting a correction value in consideration of a weight value of the vehicle to and from α value calculated through the brake pedal sensor (BPS).

In addition, the braking distance required by the driver may be calculated by adding and subtracting a correction value in consideration of a driving road environment to and from α value calculated through the brake pedal sensor (BPS).

In addition, in the operation (e), whether the vehicle driving position is a curved road or a straight road may be further determined, and regenerative braking may be performed by adding a correction value to the maximum regenerative braking value when it is determined that the vehicle driving position is the curved road.

In addition, in the operation (a), when the preceding vehicle is sensed, a surrounding lane may also be recognized to perform sensing.

In addition, in the operation (a), a charging rate of an electricity storage device may be determined together with the preceding vehicle sensing, and the operation of the regenerative braking system may be stopped when the charging rate exceeds a set reference value.

Advantageous Effects

In a driving recognition-based regenerative braking control method of an xEV vehicle according to an embodiment of the present invention, an amount of electric energy generation through regenerative braking can be increased by additionally increasing a deceleration load caused by an electric motor.

Further, in the driving recognition-based regenerative braking control method of the xEV vehicle according to the embodiment of the present invention, an amount of electric energy generation can be optimally increased by performing regenerative braking in consideration of various driving variables.

In addition, the above-mentioned effects according to the embodiment of the present invention are not limited to disclosed contents, and may further include all effects predictable from the specification and the drawings.

MODES OF THE INVENTION

Figure 1:
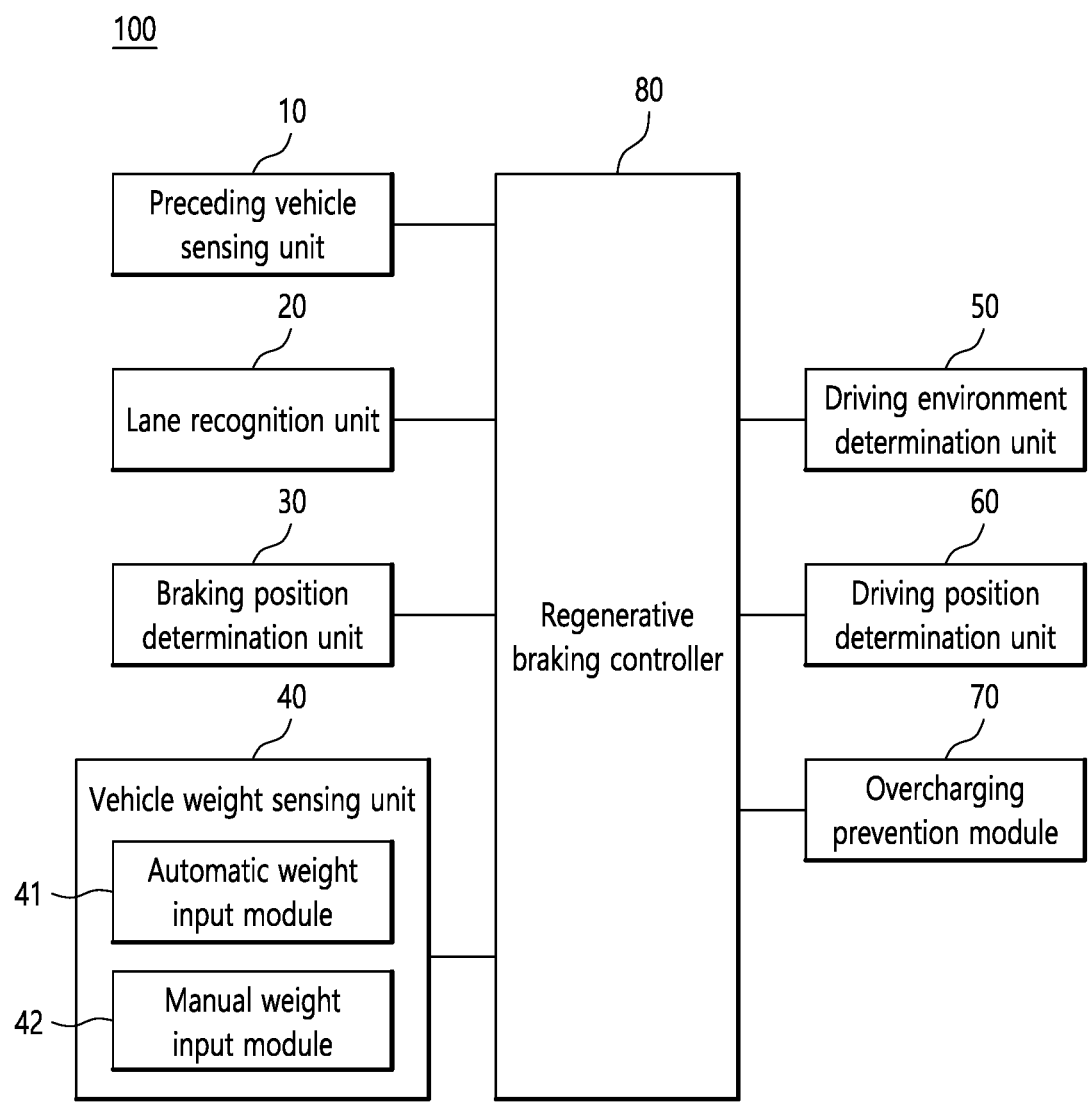
FIG. 1 is a block diagram illustrating a configuration of a regenerative braking control device capable of performing a driving recognition-based regenerative braking control method of an xEV vehicle according to an embodiment of the present invention.

Hereinafter, the description of the present invention with reference to the drawings is not limited to specific embodiments, and various changes may be applied and various embodiments may be provided. Further, it should be understood that the contents described below include all changes, equivalents, and substitutes included in the objective and scope of the present invention.

In the following descriptions, terms such as first, second, and the like are terms used to describe various components, their meanings are not limited thereto, and the terms are used only for the purpose of distinguishing one component from other components.

The same reference numerals are used for the same or similar components throughout the specification.

A singular form also includes a plural form, unless the context clearly indicates otherwise. Further, it should be understood that the terms "include," "including," "provide," "providing," "have," and/or "having" specify the presence of stated features, integers, steps, operations, elements, components, and/or a combination thereof but do not preclude the presence or addition of one or more other features, integers, steps, operations, elements, components, and/or a combination thereof.

Further, terms such as "unit", "device", "module", and the like described in the specification refer to a unit which processes at least one function or operation, and it may be implemented as hardware or software or a combination of the hardware and the software.

Before the detailed description, the present invention relates to a control method of regenerative braking of an xEV vehicle having an electric motor as a main power source, and may be applied to all of xEV vehicles to be developed or commercialized in the future in addition to currently developed or commercialized xEV vehicles such as a hybrid electric vehicle (HEV), a plug-in hybrid electric vehicle (PHEV), a battery electric vehicle (BEV), a fuel cell electric vehicle (FCEV), and the like.

Further, in order to perform the regenerative braking control method to be described, the xEV vehicle of the present invention may include both a sensor capable of figuring out a state of the vehicle and a means capable of figuring out a state of surroundings of the vehicle.

For example, a weight sensor, a speed sensing sensor, a Hall sensor, a brake pedal sensor (BPS), a global positioning system (GPS), an inertial measurement unit (IMU), and the like may be provided for figuring out a state of the vehicle, that is, a weight or speed of the vehicle, a braking state, a position, an inclination, or the like, and a means such as a radar sensor, a LiDAR sensor, a lane detection sensor, a rain sensor, a temperature sensor, a humidity sensor, a camera, or the like may be provided for figuring out a state of the vehicle's surroundings, that is, preceding vehicle sensing/determining a distance, figuring out a lane, figuring out road conditions, and the like.

Further, in order to perform the regenerative braking control method to be described, the xEV vehicle of the present invention may be linked to various systems such as a geographic information system (GIS), a navigation system, a weather information system, a traffic road information system, and the like.

In addition, although not described herein, all means capable of figuring out various states or surrounding conditions of the vehicle may be included, and it may be linked to the various systems capable of figuring out a state of the vehicle or a state of a driving road.

Accordingly, hereinafter, unless there is specific limitation in any configuration of various configurations to be described, even when a means or a system capable of performing the configuration to be described is not directly disclosed, it should be understood that the regenerative braking control method may be performed in the means or the system capable of performing the corresponding configuration.

Hereinafter, a driving recognition-based regenerative braking control method of an xEV vehicle according to an embodiment of the present invention will be described in detail with reference to the accompanying drawings.

FIG. 1 is a block diagram illustrating a configuration of a regenerative braking control device capable of performing the driving recognition-based regenerative braking control method of the xEV vehicle according to the embodiment of the present invention.

First, referring to FIG. 1, the configuration of the regenerative braking control device capable of performing the driving recognition-based regenerative braking control method of the xEV vehicle of the present invention may include a preceding vehicle sensing unit 10 which senses a preceding vehicle and a distance to the preceding vehicle, a lane recognition unit 20 which recognizes a surrounding lane of the xEV vehicle, a braking position determination unit 30 which determines a braking position of the xEV vehicle, a vehicle weight sensing unit 40 which senses a weight of the xEV vehicle, a driving environment determination unit 50 which senses a driving environment of the xEV vehicle, a driving position determination unit 60 which determines a driving position of the xEV vehicle, an overcharging prevention module 70 which senses overcharging of a battery, which is a power source of the xEV vehicle, and a regenerative braking controller 80 which receives pieces of information to be sensed, determined, and recognized from the above-described configurations 10 to 70 and performs regenerative braking with an optimum value.

Figure 2:
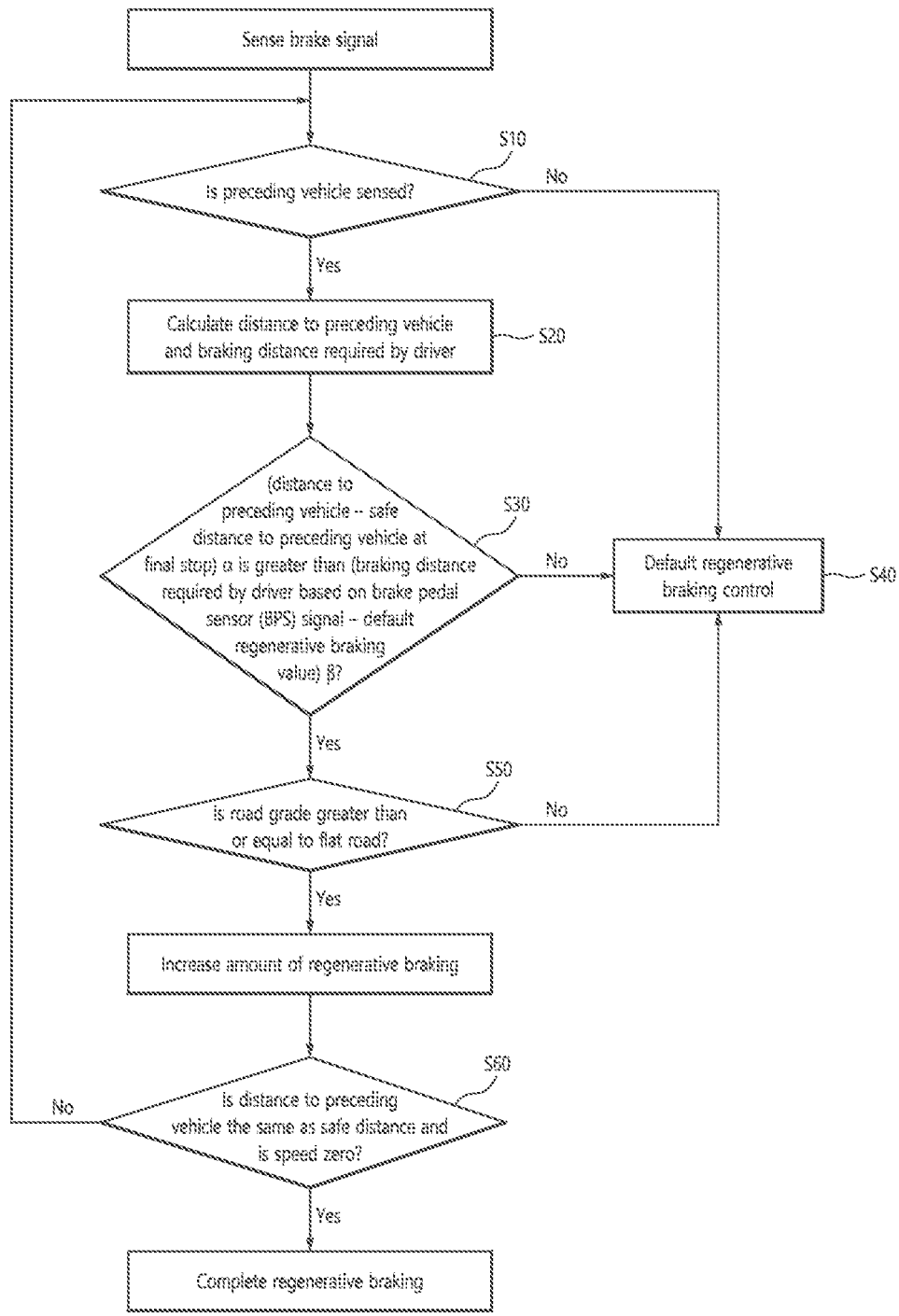
FIG. 2 is a view illustrating an algorithm of the driving recognition-based regenerative braking control method of the xEV vehicle according to the embodiment of the present invention.
Figure 3:
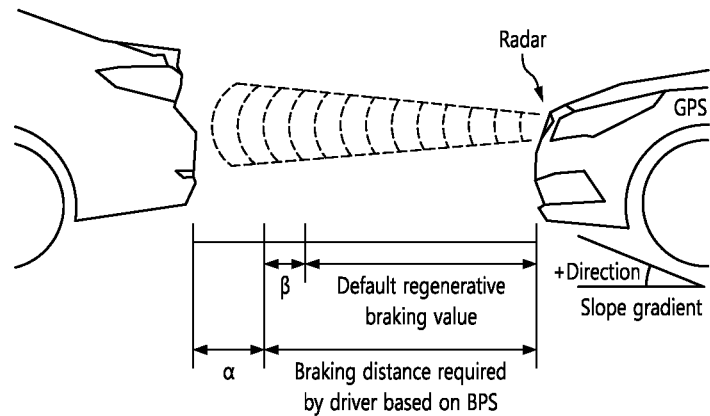
FIG. 3 is a schematic view for describing each variable including α and β values of the algorithm in FIG. 2.
Figure 4:
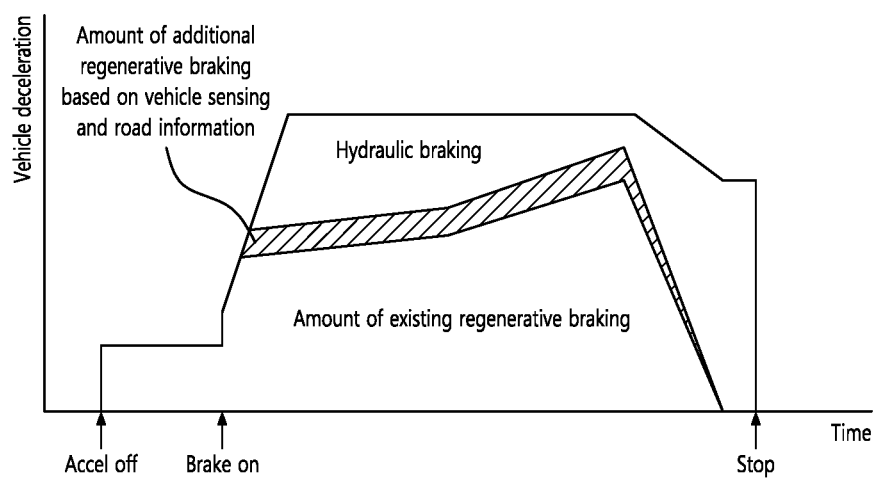
FIG. 4 is a view illustrating an effect of the driving recognition-based regenerative braking control method of the xEV vehicle according to the embodiment of the present invention.

FIG. 2 is a view illustrating an algorithm of the driving recognition-based regenerative braking control method of the xEV vehicle according to the embodiment of the present invention, FIG. 3 is a schematic view for describing each variable including α and β values of the algorithm in FIG. 2, and FIG. 4 is a view illustrating an effect of the driving recognition-based regenerative braking control method of the xEV vehicle according to the embodiment of the present invention.

Referring to FIGS. 2 to 4, the driving recognition-based regenerative braking control method of the xEV vehicle according to the embodiment of the present invention may be configured to include the operations of (a) sensing a preceding vehicle when a brake signal is applied (S10), (b) operating a regenerative braking system as much as a default regenerative braking value when the preceding vehicle is not sensed, and calculating a distance to the preceding vehicle and a braking distance required by a driver when the preceding vehicle is sensed (S20), (c) comparing an α value in which a safe distance to the preceding vehicle at the final stop is subtracted from the distance to the preceding vehicle, and a β value in which a regenerative braking distance due to the default regenerative braking value is subtracted from the braking distance required by the driver based on a signal of a brake pedal sensor (BPS) (S30), (d) operating the regenerative braking system as much as the default regenerative braking value when the β value is greater, and preparing to increase a maximum regenerative braking value as much as a difference value when the α value is greater (S40), (e) determining a vehicle driving position to operate the regenerative braking system and in a case of a downhill road, the regenerative braking system is operated as much as the default regenerative braking value, and in a case of an uphill road or a flat road, the regenerative braking system is operated as much as the maximum regenerative braking value prepared of the operation (d) above (S50), and (f) recognizing that the vehicle is stationary and stopping an operation of the regenerative braking system when the distance to the preceding vehicle becomes the same as the safe distance value and a vehicle speed becomes 0, and returning to operation (a) when the distance to the preceding vehicle is different from the safe distance value or the vehicle speed is not 0 (S60).

Specifically, in (a) operation S10 of sensing the preceding vehicle when the brake signal is applied, whether the preceding vehicle is present may be sensed from the preceding vehicle sensing unit 10, and the preceding vehicle sensing unit 10 may sense the preceding vehicle by single sensing of any one of a radar sensor and a LiDAR sensor or combination thereof.

That is, the preceding vehicle sensing may be performed by including only the radar sensor, the preceding vehicle sensing may be performed by including only the LiDAR sensor, or the preceding vehicle sensing may be performed by including both the radar sensor and the LiDAR sensor.

Here, since the radar sensor may directly sense a distance and a speed, and may perform recognition at a long distance even in a harsh environment compared to the LiDAR sensor, and the LiDAR sensor may acquire object and distance images with a resolution that enables formation recognition, so the sensing the vehicle with the combination of the radar sensor and the LiDAR sensor is the most preferable.

More specifically, the LiDAR sensor may be used at a short distance, and the radar sensor may be used at a long distance, and criteria for the short distance and the long distance may be changed according to the settings of a user or vehicle manufacturer.

Further, in the operation S10, the sensing may be performed together by recognizing the surrounding lane through the lane recognition unit 20 when sensing the preceding vehicle. This is for reducing an error in a case in which an angle of view of the preceding vehicle sensing sensor such as the radar sensor, the LiDAR sensor, or the like deviates from the driving lane of the vehicle and recognizes a driving vehicle in another lane as a preceding vehicle, or the vehicle changes lanes, or the like, and the surrounding lane may be recognized together using a lane sensing sensor or the like.

When the presence/absence of the preceding vehicle is sensed through operation S10 like the above, the regenerative braking system may be operated as much as a default regenerative braking value through control of the regenerative braking controller 80 according to the presence/absence of the preceding vehicle through operation S20, or the distance to the preceding vehicle and the braking distance required by the driver may be calculated.

More specifically, when the preceding vehicle is not sensed within a set distance by the preceding vehicle sensing unit 10, the regenerative braking controller 80 may operate the regenerative braking system as much as the default regenerative braking value, and when the preceding vehicle is sensed within the set distance, the regenerative braking controller 80 may calculate the distance to the preceding vehicle and the braking distance required by the driver for operating the regenerative braking system with a maximum regenerative braking value.

Here, the distance to the preceding vehicle may be calculated by the single sensing of any one of the radar sensor and the LiDAR sensor or the combination thereof through the preceding vehicle sensing unit 10, but the present invention is not limited thereto, and other methods may be used. For example, the distance to the preceding vehicle may be measured through a GPS of each vehicle, and the GPS may be separately installed, or a GPS installed in or linked with a navigation system of each vehicle may be used.

Further, the braking distance required by the driver may be calculated based on the brake pedal sensor (BPS) linked with a brake through the braking position determination unit 30. That is, the braking position determination unit 30 may include the brake pedal sensor (BPS), and the brake pedal sensor (BPS) calculates the braking distance required by the driver by measuring a brake pedal force.

In this case, the braking distance required by the driver may be absolutely calculated by a value calculated solely with the brake pedal sensor (BPS), but may be calculated by adding and subtracting a correction value in consideration of a weight value of the vehicle measured through the vehicle weight sensing unit 40 to and from the value calculated with the brake pedal sensor (BPS).

That is, the braking distance required by the driver may be calculated in consideration of the weight of the vehicle for the brake pedal force. In this case, the vehicle weight sensing unit 40 may measure the weight of the vehicle in consideration of a weight applied to wheels of the vehicle or the like, but may be configured to manually input the weight of the vehicle in consideration of vehicles to which additional vehicles are attached to the rear thereof such as a trailer, a camper, or the like. To this end, the vehicle weight sensing unit 40 may include an automatic weight input module 41 which automatically senses a weight in conjunction with a weight sensing sensor, a pressure sensor, or the like, and a manual weight input module 42 which receives the weight manually by the driver.

Further, the braking distance required by the driver may be calculated by adding and subtracting a correction value calculated through the driving environment determination unit 50 in consideration of a driving road environment to and from the value calculated solely with the brake pedal sensor (BPS).

That is, the braking distance required by the driver is calculated in consideration of the driving road environment for the brake pedal force. Here, the driving road environment refers to various driving environments such as an icy road, a snowy road, a rainy road, an unpaved road, a mountain road, and the like, and the driving environment determination unit 50 may provide a rain sensor or the like or may be linked with a weather information system, a traffic road information system, or the like, and may add or subtract a correction value for calculating the braking distance required by the driver calculated through the braking position determination unit 30 according to the above-described driving road environment determined by a manual input of the driver.

For example, since the vehicle may be pushed more on an icy road at the same brake pedal force, the pedal force may be corrected to a lower pedal force than an existing brake pedal force, and since the vehicle may be pushed less on an unpaved road or the like at the same brake pedal force, the pedal force may be corrected to a higher pedal force than the existing brake pedal force.

Considering the vehicle weight value or the driving road environment like the above, the braking distance required by the driver may be more accurately calculated.

Further, the braking distance required by the driver may be calculated through a speed sensing sensor, a Hall sensor, and the like and the braking position determination unit 30 may determine the braking position based on various types of sensing information using the brake pedal sensor (BPS), the speed sensing sensor, the Hall sensor, and the like.

When the distance to the preceding vehicle and the braking distance required by the driver are calculated in the operation S20 like the above, in the operation S30, the regenerative braking controller 80 may receive calculation information from each of the preceding vehicle sensing unit 10 and the braking position determination unit 30 to calculate and compare the α value in which the safe distance to the preceding vehicle at the final stop is subtracted from the distance to the preceding vehicle, and the β value in which the regenerative braking distance due to the default regenerative braking value is subtracted from the braking distance required by the driver based on the brake pedal sensor (BPS) signal.

Here, according to a comparison of the α value and the β value, in the operation S40, the regenerative braking controller 80 may be configured to operate the regenerative braking system as much as the default regenerative braking value or to prepare to increase the regenerative braking distance as much as a difference value.

More specifically, when the α value and the β value are compared, the regenerative braking system is operated as much as the default regenerative braking value when the β value is greater, and the maximum regenerative braking value is prepared to be increased up to the α value when the α value is greater.

Then, in the operation S50, the vehicle driving position is determined through the driving position determination unit 60 to operate the regenerative braking system as much as the default regenerative braking value in the case of the downhill road, and to operate the regenerative braking system with the maximum regenerative braking value prepared in the operation S40, that is, up to the α value in the case of the uphill road or the flat road.

Accordingly, in the regenerative braking control method of the present invention, when a calculated extra braking distance to the preceding vehicle is secured and the braking distance is not a downhill slope, as shown in FIG. 3, an amount of electric energy generation through the regenerative braking may be increased by additionally increasing a deceleration load caused by an electric motor.

Meanwhile, the vehicle driving position may be determined by the driving position determination unit 60 in the operation S50 through single measurement of any one of the GPS and an inertial measurement unit (IMU) or combined measurement thereof. For example, in the case of the combined measurement of the GPS and the inertial measurement unit (IMU), a position may be measured through the GPS on a road with open surroundings, and a position may be measured through the inertial measurement unit (IMU) in a GPS shaded region such as a tunnel whose surroundings are closed, or the like.

Further, in the determination of the vehicle driving position by the driving position determination unit 60 in the operation S50, whether the driving position of the vehicle is a curved road or a straight road may be further determined. This is because the curved road may be substantially longer even when the distance to the preceding vehicle recognized according to the straight road and the distance to the preceding vehicle recognized according to the curved road are recognized as the same, and the regenerative braking may be performed by adding a correction value and the maximum regenerative braking value when it is determined that the driving position of the vehicle is the curved road.

Here, determination of the curved road may be determined through various measurement variables, such as an angle with the preceding vehicle to be recognized, inclination sensing of the vehicle through the inertial measurement unit (IMU), a position through the GPS, a steering angle of the vehicle, and the like, and all other measurement variables which are not described above may also be used.

When the regenerative braking is performed like operation S50, the operation of the regenerative braking system may be stopped in the operation S60 or the above-described regenerative braking cycle may be repeatedly performed by returning to operation S10.

More specifically, in the operation S60, it is recognized that the vehicle is stationary and thus the operation of the regenerative braking system is stopped when the distance to the preceding vehicle becomes the same as the safe distance value to the preceding vehicle and the vehicle speed becomes 0, and operations S10 to S60 may be repeatedly performed by returning to operation S10 again when the distance to the preceding vehicle is different from the safe distance value to the preceding vehicle or the vehicle speed is not 0.

Further, before performing the above-described operations S20 to S60, in the operation S10, a charging rate of an electricity storage device of the vehicle may be determined together with the sensing of the preceding vehicle when the brake signal is applied through the overcharging prevention module 70.

In this case, when the charging rate exceeds a set reference value, the operation of the regenerative braking system is stopped, and when the charging rate does not exceed the set reference value, by performing operations S20 to S60, overcharging of the electricity storage device may be prevented, and fire or the like due to overcharging may be prevented.

In the driving recognition-based regenerative braking control method of the xEV vehicle according to the embodiment of the present invention like the above, as shown in FIG. 4, the amount of electric energy generation through regenerative braking may be increased by additionally increasing the deceleration load caused by the electric motor.

In the above, although embodiments of the present invention have been described with reference to the accompanying drawings, those skilled in the art may understand that the present invention may be embodied in other specific forms without changing the technical objective or essential features of the present invention. Accordingly, the above-described embodiments are exemplary in all respects and not limiting.

REFERENCE NUMERALS

10: preceding vehicle sensing unit
20: lane recognition unit
30: braking position determination unit
40: vehicle weight sensing unit
41: automatic weight input module
42: manual weight input module
50: driving environment determination unit
60: driving position determination unit
70: overcharging prevention module
80: regenerative braking controller

The invention claimed is:

1. A regenerative braking control method of an xEV vehicle based on driving recognition, the control method comprising:
  sensing a preceding vehicle when a brake signal is applied;
  operating a regenerative braking system according to a default regenerative braking value when the preceding vehicle is not sensed, and when the preceding vehicle is sensed, calculating a distance to the preceding vehicle and a braking distance required by a driver through a signal of a brake pedal sensor (BPS);
  comparing an $\alpha$ value in which a safe distance to the preceding vehicle at a final stop is subtracted from the distance to the preceding vehicle, and a $\beta$ value in which a regenerative braking distance due to a default regenerative braking value is subtracted from the braking distance required by the driver based on the signal of the brake pedal sensor (BPS);
  operating the regenerative braking system according to the default regenerative braking value when the $\beta$ value is greater than the $\alpha$ value, and preparing to increase a maximum regenerative braking value according to the $\alpha$ value when the $\alpha$ value is greater than the $\beta$ value;
  determining a vehicle driving position to operate the regenerative braking system, and in a case of a downhill road the regenerative braking system is operated according to the default regenerative braking value, and in a case of an uphill road or a flat road the regenerative braking system is operated according to the maximum regenerative braking value; and
  when the distance to the preceding vehicle becomes equal to a safe distance value and a speed of the xEV vehicle becomes 0, recognizing that the xEV vehicle is stationary and stopping the operating the regenerative braking system, and when the distance to the preceding vehicle is different from the safe distance value or the speed of the xEV vehicle is not 0, returning to the sensing the preceding vehicle when the brake signal is applied,
  wherein the braking distance required by the driver is calculated by adding or subtracting a correction value in consideration of a driving road environment to or from $\alpha$ value calculated through the brake pedal sensor (BPS).

2. The method of claim 1, wherein the sensing the preceding vehicle and the calculating the distance to the preceding vehicle are operated through single sensing of any one of a radar sensor and a LIDAR sensor or combination thereof.

3. The method of claim 1, wherein the determining the vehicle driving position is performed through single measurement of any one of a global positioning system (GPS) and an inertial measurement unit (IMU) or combination thereof.

4. The method of claim 1, wherein the braking distance required by the driver is calculated by adding or subtracting a correction value in consideration of a weight value of the xEV vehicle to or from $\alpha$ value calculated through the brake pedal sensor (BPS).

5. The method of claim 1, wherein the determining the vehicle driving position to operate the regenerative braking system comprises:
  determining whether the vehicle driving position is a curved road or a straight road; and
  performing the regenerative braking system by adding a correction value to the maximum regenerative braking value when the vehicle driving position is determined to be the curved road.

6. The method of claim 1, wherein the sensing the preceding vehicle when the brake signal is applied comprises: when the preceding vehicle is sensed, a surrounding lane is recognized together to perform the sensing.

7. The method of claim 1, wherein the sensing the preceding vehicle when the brake signal is applied comprises: determining a charging rate of an electricity storage device together with the sensing the preceding vehicle; and stopping the regenerative braking system when the charging rate exceeds a set reference value.

* * * * *